May 29, 1934.   G. F. PFEIFFER   1,960,548
METHOD OF FORMING MINERAL FEED BLOCKS
Filed June 10, 1932
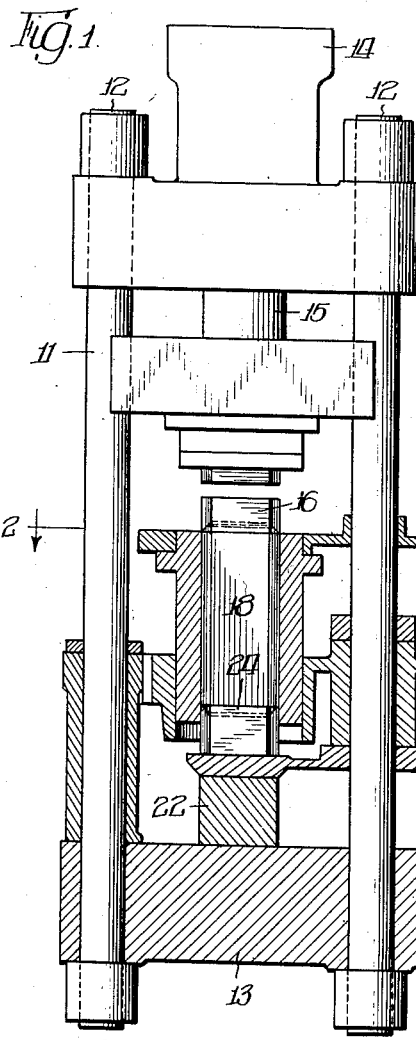
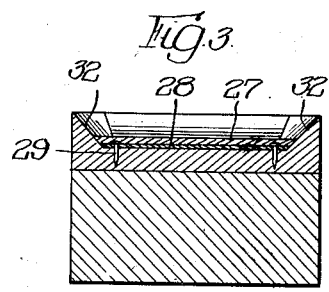
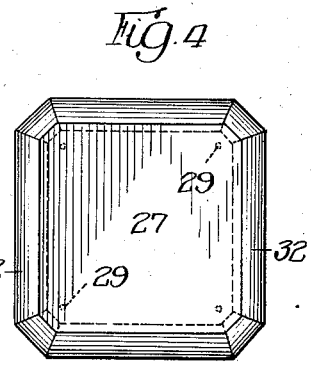
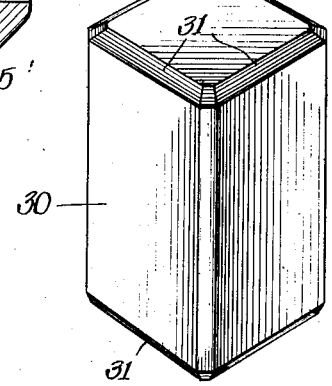
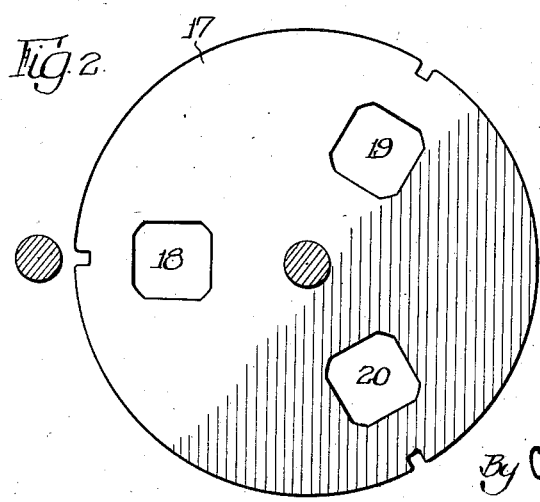
Inventor:
Grover F. Pfeiffer,
By Cromwell, Treist & Warden
attys Patented May 29, 1934

1,960,548

UNITED STATES PATENT OFFICE 1,960,548

METHOD OF FORMING MINERAL FEED BLOCKS

Grover F. Pfeiffer, Quincy, Ill., assignor to Moorman Manufacturing Company, Chicago, Ill., a corporation of Illinois Application June 10, 1932, Serial No. 616,430

3 Claims. (Cl. 107—54)

The present invention relates to a process and apparatus for forming blocks of mineral feed under a substantially high pressure and constitutes a continuation in part of my copending application, Serial No. 469,377, filed July 21, 1930.

It has been found advantageous in the feeding of livestock such as cattle, sheep, hogs and poultry to employ substantial quantities of mineral feed in the diet. If fed to the livestock in powdered form, a large percentage of the mineral feed is wasted, as by being scattered. When employed in the form of blocks produced by compressing the loose mineral feed, the problem of waste is largely solved and the feed is more noticeable to the livestock in addition to apparently being more palatable.

A primary object of the present invention is to provide a process and apparatus for successfully producing mineral feed blocks of the type described.

This and other objects will be apparent from a consideration of the following specific description and by reference to the accompanying drawing, in which Fig. 1 shows a machine for forming blocks of mineral feed;

Fig. 2 is a sectional view taken on line 2—2 of Fig. 1;

Fig. 3 is a sectional view of a pressure block or mold end made in accordance with my invention;

Fig. 4 is a top view of the mold shown in Fig. 3;

Fig. 5 is a view of a mineral feed block made in accordance with my invention; and Fig. 6 is a view disclosing one end of the mineral feed block broken off approximately one inch from the end.

Mineral feed of the type made into blocks in accordance with my invention customarily contains a number of special ingredients for the livestock diet, such as bone black or charcoal, granular to powdered; copperas, granular; bicarbonate of soda; lime phosphate, powdered; limestone, granular to fine powder; salt, ground fine; steamed bone meal, granular to dust; sulphur, fine powder; tobacco, granular to dust; molasses or hydrol, and paraffin. The nature of the material when ready for being formed into blocks is preferably similar in wetness, texture and feel to a mixture of core sand used in foundries. It will be understood that the ingredients of the mineral feed will be varied in accordance with the particular results desired. However, herein and in the appended claims the term "mineral feed" is used to denote a mixture of materials of the types described, as will be obvious to one skilled in the art.

In the drawing, the reference numeral 11 indicates a machine for forming mineral feed into blocks. This machine has a pair of upright bars 12 of heavy construction mounted in a base 13. A pressure cylinder 14 is mounted at the top ends of the upright bars 12 and is provided with a plunger 15 to which is attached one of the pressure blocks, as shown at 16. Directly below the pressure block is a mold table 17 of cylindrical shape, as shown in Fig. 2, which is provided with three hollow molds or forms 18, 19 and 20, respectively. This molding mechanism is rotatably mounted on one of the bars 12 and is guided by a bracket 21. The base or bed plate 22 of the molding mechanism is stationary and the mechanism rotates thereon.

As shown in Fig. 1, the molding mechanism comprises hollow metallic molds or forms with smooth metal sides of a length substantially greater than the length of the finished mineral feed block, each of said molds being provided at its bottom with a pressure block which rides on the bed plate 22. Two of these bottom pressure blocks are indicated in the drawing by reference numerals 23 and 24. The bottom pressure blocks are adapted to slide in the molds and are constructed as shown in Figs. 3 and 4. That is, the faces of the pressure blocks are made of the configuration which it is desired to impart to the mineral feed block.

A device for ejecting the mineral feed blocks from the molding mechanism is shown at 25. This device consists of a ram 26 which is adapted to push up through the mold 20 and remove the mineral feed block up above the surface of the molding mechanism.

In operation of the machine in the molding of mineral feed blocks, one of the hollow molds is filled with the loose mineral feed which is to be compressed, and the pressure block 16 is placed on the top of the material. The molding mechanism 14 is then rotated until the material is positioned beneath the compressor. Pressure is then exerted on the block 16 and the mineral feed is compressed into block form. The pressure is then released and the molding mechanism is rotated until the mold is positioned over the ejecting device 25, whereupon pressure is exerted on the bottom pressure block and the mineral feed block is ejected from the top of the mold. There being three molds or forms, operation of the device may be continuous, the pressure block 16 being removed from the mineral feed blocks and placed over the loose mineral feed next to be pressed.

In accordance with my invention the horizontal faces of the pressure blocks are provided with a sheet of rubber or other resilient material. As shown in Figs. 3 and 4, the sheet 27 of rubber is vulcanized to a metallic plate 28, the plate 28 being secured to the pressure block by means of fastening members 29, which may be brass dowel pins. It has been found in practice that a sixteen gauge steel plate upon which has been vulcanized a layer of rubber 3/16th of an inch in thickness will operate satisfactorily. It is possible to have the device work fairly well by placing a loose sheet of rubber in the pressure blocks, but this latter form of construction is less desirable than that in which the rubber is vulcanized to a sheet of material which can be firmly secured to the faces of the pressure blocks, as the mineral feed often works its way in the back of the loose rubber and thereby causes difficulty.

If a layer of rubber is not employed on the horizontal portion of the pressure block, a large percentage of the mineral feed blocks will be found to be imperfect and the loss occasioned thereby is so great that commercial production of the blocks is impractical. It will be noted that the mineral feed block 30 formed by the machine has beveled edges 31 formed by the top and bottom pressure blocks. These pressure blocks have correspondingly beveled sides 32. The edges of the mineral feed blocks are beveled so that the finished block will not be marred by having sharp edges which are easily broken. To impart this convex or beveled shape to the mineral feed block it is necessary that the pressure blocks and mold be of a complementary shape, which means that the pressure blocks are of generally concave shape. When the mineral feed blocks are removed from the machine the pressure blocks have a tendency to cause the top and bottom of the block to pull off. The breaks usually occur where the beveled portions of the top and bottom intersect with the vertical side portions, thereby leaving the cups or indented portions of the pressure blocks full of material. The breaking off of the tops and bottoms of the blocks is not caused by the mineral feed sticking to the pressure blocks as would a sticky material, such as plastic candy, since the mineral feed will not adhere to a metallic surface when pressed thereagainst. It is possible that this breaking of the end portions of the mineral feed block is due to the creation of a vacuum in the indented or concave pressure block. At any rate, the provision of a rubber face on the inner portion of the pressure blocks prevents the customary breaking off of the end portions of the mineral feed block. Fig. 6 illustrates a typical broken-off end portion 33 after its removal from the indented pressure block. The broken-off portion is irregular but in general will be found to be of approximately one inch thickness.

The amount of pressure employed will depend upon such factors as the size of the mold and the nature of the constituents of the mineral feed. It has been found desirable to produce blocks weighing approximately fifty pounds and in such cases a pressure of between 1,000 pounds per square inch and 2,000 pounds per square inch is ordinarily required to produce a stable block. Here and in the appended claims the term "high pressure" is therefore employed to distinguish from the relatively low pressure types of molds which might be suitable for candy making purposes and the like and to denote a pressure of the general order of 1,000 pounds per square inch or more. It will be understood that while a pressure of between 1,000 pounds and 2,000 pounds per square inch is particularly desirable, conditions can be controlled so that somewhat smaller or larger pressures can be employed. In forming the blocks, fifty pounds of the loose mineral feed in a slightly dampened condition is placed in the molds which are approximately 8 inches square in cross section and approximately 24 inches deep. When compressed, the blocks are approximately 12 inches in height. It will be seen that the reduction in volume from the loose mineral feed from the mineral feed blocks is almost 50 per cent. After the material is placed in the mold and pressed, it is removed from the mold in a compact but slightly "wet" condition. These blocks are preferably cured from 24 to 36 hours in order that they may reach their maximum strength before shipment. The mineral feed-forming block machine is ordinarily operated at a speed which will allow the production of approximately 3 blocks per minute.

The various modifications of the above described invention are intended to be included in the appended claims.

I claim:

1. The method of forming coherent and homogeneous blocks of mineral feed material which comprises subjecting loose and slightly dampened mineral feed material to a pressure sufficient to compress the material to substantially one half of its original volume between rubber faced pressure blocks.

2. The method of forming blocks of mineral feed material having a regular contour which comprises the placing of loose and slightly dampened mineral feed material in a mold, and subjecting the material to a high pressure between rubber faced end blocks until a coherent and homogeneous block is formed.

3. The method of forming coherent and homogeneous blocks of mineral feed material having beveled edges, which comprise the introducing of loose and slightly dampened mineral feed material in a mold having the desired contour to form beveled edges, and subjecting the material to pressure in excess of a thousand pounds per square inch in contact with an end pressure member having a rubber facing and of a contour to form beveled edges.

GROVER F. PFEIFFER.